United States Patent [19]

Parulski et al.

[11] Patent Number: 5,270,839
[45] Date of Patent: Dec. 14, 1993

[54] DUAL IMAGING STATION PHOTOPRINT SCANNER

[75] Inventors: Kenneth A. Parulski, Rochester; Douglas H. Smith, Spencerport; Richard F. Manley; Carole A. Bilson, both of Rochester, all of N.Y.

[73] Assignee: Eastman Kodak Company, Rochester, N.Y.

[21] Appl. No.: 762,323

[22] Filed: Sep. 16, 1991

[51] Int. Cl.$^5$ .............................................. H04N 1/40
[52] U.S. Cl. ..................... 358/474; 358/444
[58] Field of Search ............... 358/400, 401, 474, 481, 358/482, 488, 494, 497, 498, 449, 451, 462, 444; 355/231, 232, 233, 243

[56] References Cited

U.S. PATENT DOCUMENTS

| | | | |
|---|---|---|---|
| 4,068,950 | 1/1978 | Kito | 355/231 |
| 4,266,252 | 5/1981 | Cox et al. | 358/494 |
| 4,417,281 | 11/1983 | Hama | 358/451 |
| 4,487,482 | 12/1984 | Itoh et al. | 358/451 |
| 4,574,316 | 3/1986 | Wilman et al. | 358/498 |
| 4,656,525 | 4/1987 | Norris | 358/280 |
| 4,912,563 | 3/1990 | Narita | 358/401 |
| 5,075,788 | 12/1991 | Funada | 358/462 |
| 5,105,284 | 4/1992 | Sakata et al. | 358/401 |

FOREIGN PATENT DOCUMENTS 0291042  11/1988
3937556-A1  5/1991  Fed. Rep. of Germany.

Primary Examiner—Edward L. Coles, Sr.
Assistant Examiner—Jerome Grant, II
Attorney, Agent, or Firm—David M. Woods

[57] ABSTRACT

A dual image station photoprint scanner comprises a cabinet having an upper, album imaging station and a lower, magazine-fed, platen imaging station. The upper imaging station includes a translatable unit having a glass plate upon which a photoprint is placed in a face-down position. Adjacent to the top plate, the translatable cabinet has a sloped support surface, to accommodate a photo album. A lower portion of the cabinet contains a platen feed mechanism, which translates a photographic print support platen from a supply magazine to a platen imaging station, and then feeds the platen to a storage magazine. A high resolution CCD image sensor is supported at an image projection plane of a multidirectional image projection mechanism. A digital imagery data recording mechanism is coupled to the image sensor and is operative to record, on a digital data storage medium, a digitized image that has been projected on the image sensor. The multi-directional image projection mechanism comprises an adjustable image magnification device, such as an adjustable focal length, adjustable focus, zoom lens, which is operative to controllably vary the size of the image projected onto the image sensor in accordance with the contents of one or more photoprint parameter regions on the platen. The image projection mechanism also includes a controllably rotatable mirror disposed between the top plate and the platen imaging station for selectively providing an optical projection path from one of the imaging stations to the CCD sensor.

23 Claims, 4 Drawing Sheets

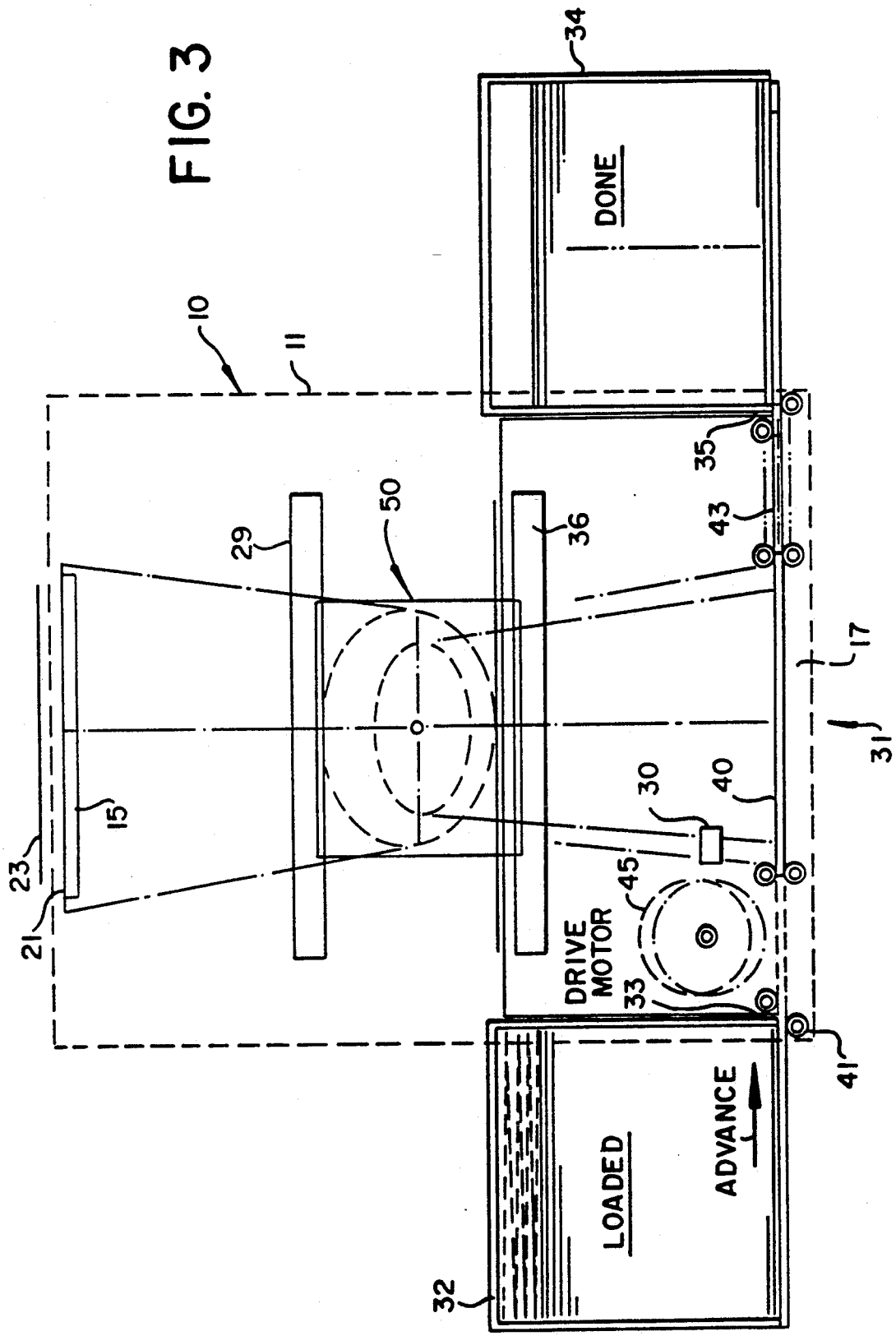

DUAL IMAGING STATION PHOTOPRINT SCANNER

FIELD OF THE INVENTION

The present invention relates in general to digital image processing systems and is particularly directed to a photoprint scanning apparatus having two separate imaging stations that enable photoprints to be automatically scanned and digitized as they are sequentially fed to a platen imaging station, or to be individually scanned and digitized from within a collective group, as when secured to a page of a photo album, which is placed in a face down condition on a transparent plate of an album-accommodating imaging station.

BACKGROUND OF THE INVENTION

Recent improvements in their spatial and data resolution capabilities have made digital color image processing systems attractive for a number of photo-processing (e.g. photo-finishing) applications. In still color image photography, for example, once an image (such as that captured on color photographic film or a high resolution color digital camera) has been digitized and stored in an attendant data base, it is readily optimized for reproduction by means of photo-finishing image processing software. Such image processing systems also provide for the storage and retrieval of high resolution digitized color still images for application to a variety of reproduction devices. This not only enables the photofinisher to optimize the quality of a color image print, but allows the images on a processed roll of film to be stored in digital format on a compact disc (CD), which may then be delivered to the customer for playback by a CD player and display on a television set.

One such apparatus is described in co-pending U.S. patent application Ser. No. 582,305, filed Sep. 14, 1990, entitled "Multiresolution Digital Imagery Photofinishing System," by S. Kristy, assigned to the assignee of the present application and the disclosure of which is herein incorporated. As diagrammatically illustrated in FIG. 1, such a digitizing apparatus may employ a high resolution opto-electronic film scanner 12, the output of which is coupled to a host digitized image processor (host computer) 14. Scanner 12 typically contains a very high resolution sensor array capable of generating high spatial resolution (e.g. a 3072×2048 pixel matrix) output signals which, when converted into digital format, yield 'digitized' photographic image files from which high quality color prints may be obtained. Scanner 12 is arranged to be optically coupled with a photographic recording medium, such as a consumer-supplied 35 mm color film strip 16. Film strip 16 contains a plurality (e.g. a set of twenty-four or thirty-six) 36 mm×24 mm color image frames. For each scanned image frame, high resolution scanner 12 outputs digitally encoded data, representative of the opto-electronic response of its high resolution imaging sensor pixel array, onto which a respective photographic image frame of film strip 16 is projected by the scanner's input lens system.

This digitally encoded data, or 'digitized' image, is supplied in the form of an imaging pixel array-representative bit map, resolved to a prescribed code width (e.g. eight bits per color per pixel), to a host processor 14. Host processor 14 performs an image encoding and storage operation by way of which each high resolution digitized image file is stored, preferably in a multi-resolution, hierarchical format. Such a storage format facilitates retrieval of the digitized images for reproduction by a variety of devices the resolution of which may vary from device to device, such as a low/moderate NTSC television monitor or a very high resolution, digitally driven, color thermal printer The spatial parameters of each of the hierarchical image files into which an original 3072 pixel×2048 pixel digitized image file is encoded and stored are chosen to facilitate the implementation and incorporation of a low cost, reduced complexity frame store/data retrieval architecture into a variety of reproduction devices, thereby providing for rapid call-up and output (display or print out) of one or more selected images.

In addition to using such improved photofinishing equipment to process current day images, such as capturing original color images in digital format by way of a high resolution digitizing color camera, or scanning a roll of color negative film, there is also the demand for using such digital image processing capability to convert 'old' photographs, such as dated photoprints that have been kept in a loose pile in a 'shoebox' or mounted in a family photo album, into digital format for CD storage, thereby allowing a customer to store and catalog the print images for subsequent television viewing.

SUMMARY OF THE INVENTION

In consideration of this need, the present invention is directed to a dual station photoprint scanner having the ability to optically scan and digitize an individual or a plurality of photoprint images, such as 'dated' photographs which the customer may bring to the photofinisher in a loosely arrayed pile or mounted in a photo-album binder, thereby allowing a photofinisher to rapidly process any number of pictures supplied by the customer, irrespective of the form or condition (occasionally crinkled) in which the photoprints are supplied.

To accommodate the processing of both individual photoprints and those that have been kept in a bound condition, such as a photo album, the scanner comprises a housing or cabinet having an upper or topside placement/album imaging station and a lower, magazine-fed platen imaging station. The upper imaging station comprises a translatable unit having a transparent (e.g. glass) plate upon which a photoprint may be placed in a face-down position. Adjacent to the top plate, the translatable cabinet has a sloped support surface, thereby providing a broad imaging support area for a large item, such as a photo album. The photo album is placed on the top plate face-down, so that a page of the photo album may be easily placed in direct imaging-abutment with the top plate. The ability to translate or shift the upper imaging station means that a large item such as a photo album may be physically transported to an optimum position for scanning the photoprint retained on the face down page. A first fluorescent lamp illuminator is arranged beneath the top plate for illuminating the upper imaging station.

A lower portion of the cabinet contains a platen feed mechanism, which translates a photographic print support platen from a first supply magazine to a platen imaging station, and then feeds the platen from the platen imaging station to a second take up storage magazine. The platen imaging station is illuminated by a fluorescent lamp illuminator arranged directly above it.

An opto-electronic image sensor is supported within the housing at an image projection plane of a multidirectional image projection mechanism. A digital imagery data recording mechanism is coupled to the high resolution CCD image sensor, and is operative to record, on a digital data storage medium, such as a compact disc, a digitized image that has been projected on the image sensor by the image projection mechanism.

The image projection mechanism comprises an adjustable image magnification device, such as an adjustable focal length, adjustable focus, zoom lens, which is operative to controllably vary the size of the image projected onto the image sensor. The image seen by the sensor is coupled to a 'preview' display monitor to allow the scanner operator to adjust the settings of the image projection mechanism and thereby optimize the parameters of the captured and digitized image. For an automatic imaging mode of operation, in which a plurality of platen-mounted photoprints are fed to the platen imaging station and scanned in sequence, the operation of the adjustable image magnification device may be controlled in accordance with the contents of one or more photoprint parameter regions on the platens. The image projection mechanism also includes a controllably rotatable mirror disposed between the top plate and the platen imaging station for selectively providing an optical projection path from one of the imaging stations to the CCD sensor.

BRIEF DESCRIPTION OF THE DRAWINGS

FIGS. 3 and 4 are diagrammatic respective front and side views of the internal architecture of the photoprint digitizing scanner of FIG. 2.

DETAILED DESCRIPTION

Figure 1:
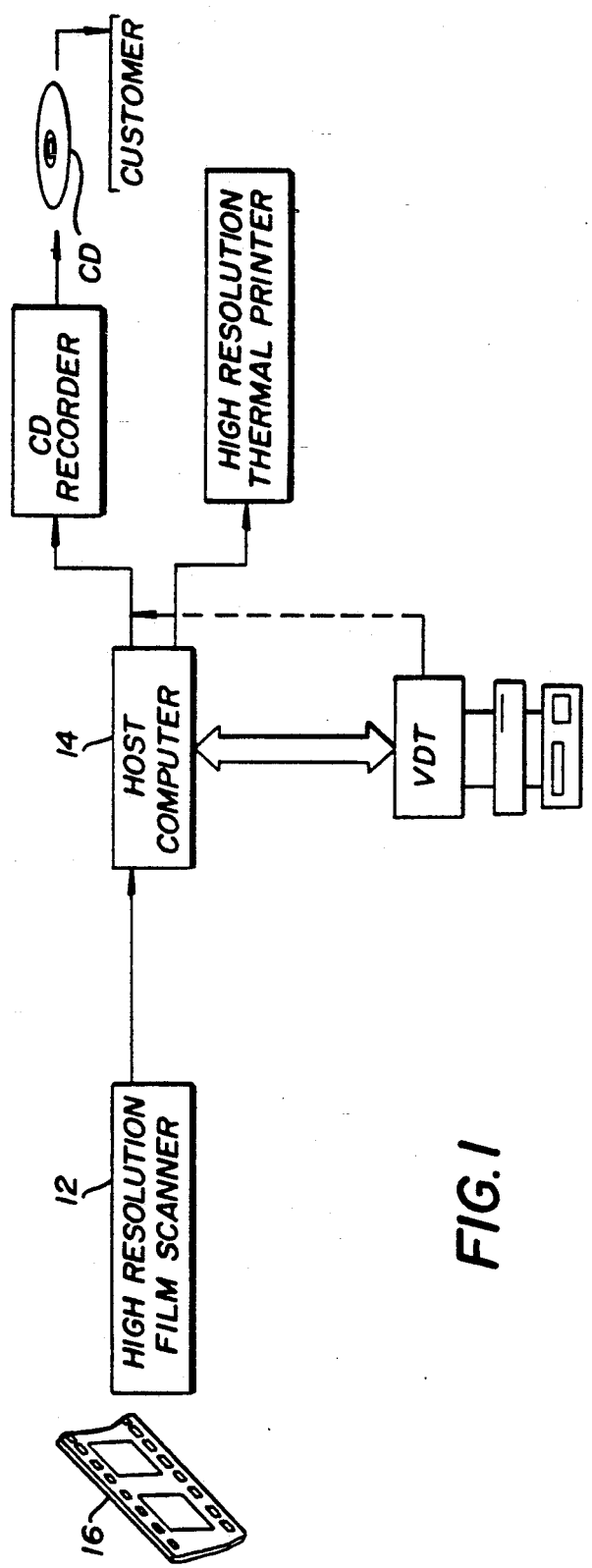
FIG. 1 diagrammatically illustrates a digital imagery photofinishing system.
Figure 2:
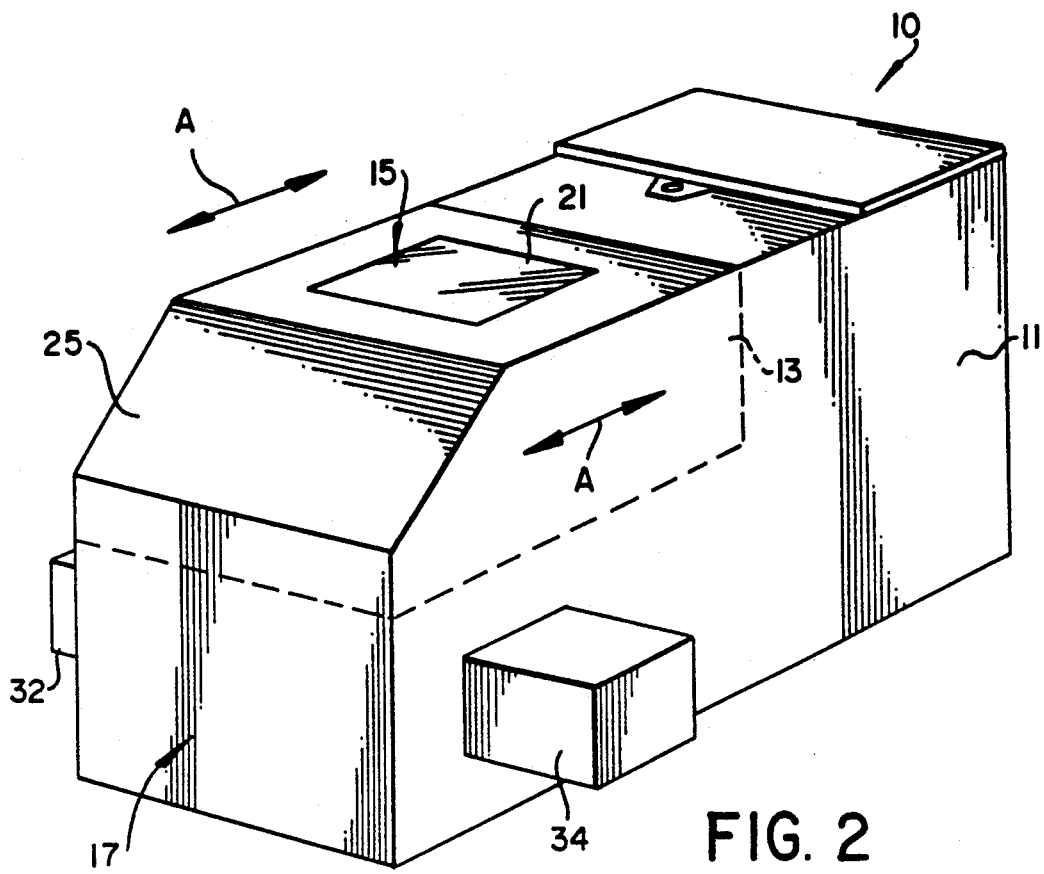
FIG. 2 is an exterior perspective view of a dual imaging station, photoprint digitizing scanner in accordance with an embodiment of the present invention.
Figure 4:
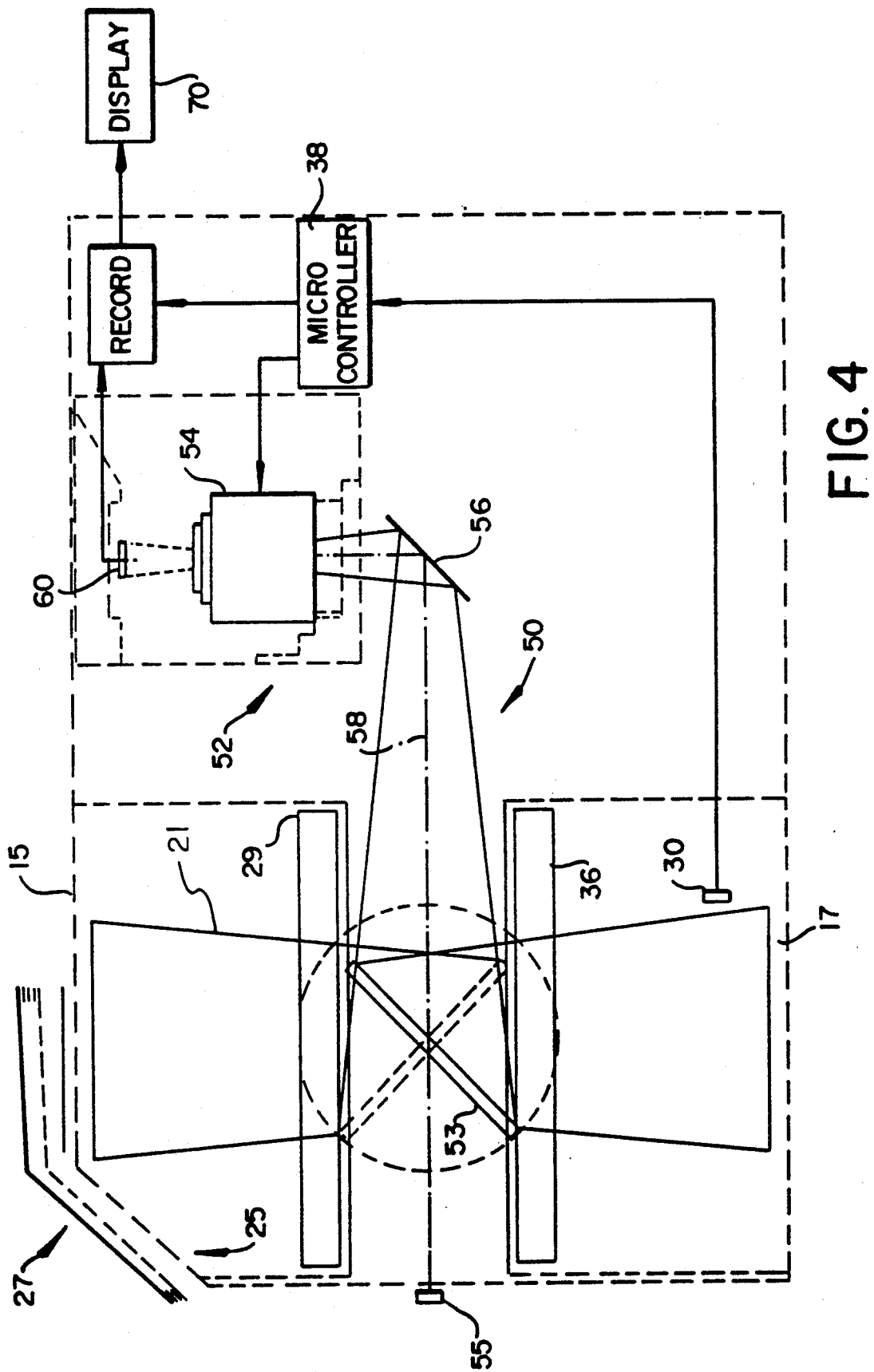

FIG. 2 is an exterior perspective view, while FIGS. 3 and 4 are diagrammatic respective front and side views of the internal architecture of a dual imaging station, photoprint digitizing scanner 10 in accordance with an embodiment of the present invention. Scanner 10 preferably comprises a housing or cabinet 1, having an upper, horizontally translatable unit 13, which supports a large area imaging station 15 for viewing an individual photoprint either by itself or retained on a page of a photo album or the like. Beneath translatable unit 13 (and upper imaging station 15) is a lower, magazine-fed platen imaging station 17. Translatable unit 13 is supported for back and forth horizontal movement in the direction of arrows A, either manually or by a drive motor (not shown), for the purpose of bringing a desired portion of imaging station 15 into optimum registration with viewing optics through which a photoprint is imaged onto a downstream image sensor 63.

The upper imaging station 15 comprises a transparent (e.g. glass) plate 21 upon which an individual sheet of photographic recording material 23, such as a photoprint, may be placed in a face-down condition. Adjacent to top plate 21, translatable unit 13 has a sloped support surface 25, thereby providing, in cooperation with top plate 21, a broad area surface for supporting a large item, such as a photo album (shown diagrammatically in broken lines 27 in its open, face-down condition), so that a page of the photo album may be easily placed in direct imaging-abutment with top plate 21. A first imaging station illuminator 29 comprised of a rectangular configuration of a set of four fluorescent lamps is located beneath top plate 21, so as to provide effectively even illumination of a sheet or page of recording material that is placed face down on top plate 21.

A lower portion of cabinet 11 retains a platen feed mechanism 31, which is operative to withdraw and transport a photographic print support platen from a first platen supply magazine 32 to a platen imaging station 17, and then feed the platen from the platen imaging station to a second take up platen storage magazine 34. An individual photoprint-support platen is preferably of a type detailed in co-pending U.S. patent application Ser. No. 760,437, filed Sep. 16, 1991, entitled "Photoprint Retaining Platen For Digitizing Image Scanner", by K. A. Parulski et al, assigned to the assignee of the present application and the disclosure of which is herein incorporated.

Figure 5:
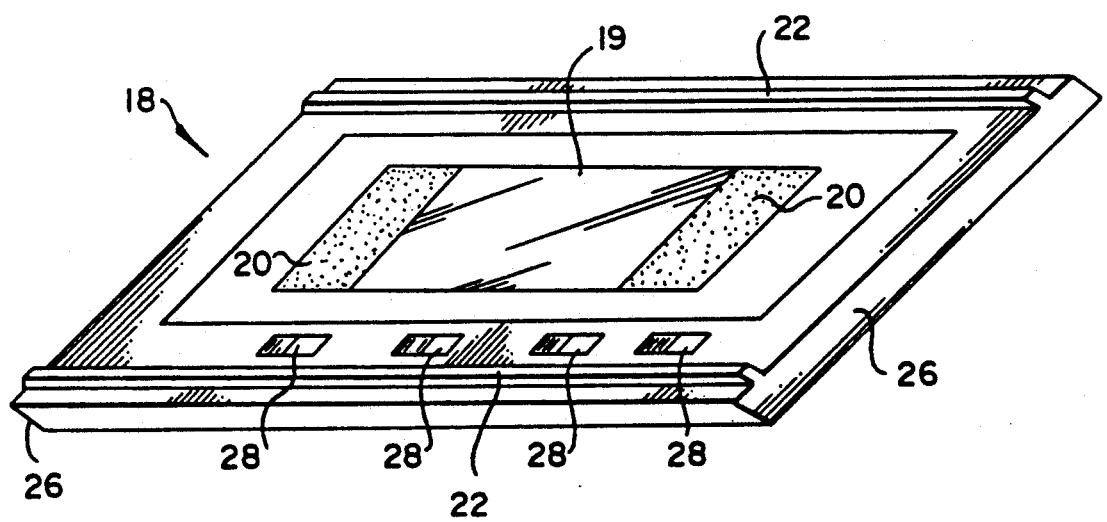
FIG. 5 diagrammatically illustrates a photoprint-support platen.

A photoprint-support platen as described in that application may be generally configured as diagrammatically illustrated at 18 in FIG. 5. The purpose of the platen is to facilitate presentation of a photoprint to an imaging station of the photoprint imaging scanner, in a secure protected condition, while also allowing a plurality of photoprints to be arranged in a stack and fed one at the time to a platen imaging station, and then fed from the platen imaging station to a take up location. Preferably, a photoprint support- platen includes a photoprint-retention or mounting surface area 19 which contains a semi-tacky material 20 for removably securing a photoprint to the platen, so that the platen may be re-used with different photoprints.

Adjacent to the mounting surface area are side rails 22, which provide a height barrier and thereby prevent a mounted photoprint from being contacted by an adjacent platen, when the platens are stacked together. The ends 26 of the platen are sloped or beveled to facilitate interleaving of multiple platens in a stack. One or more image parameter regions 28 are located adjacent to a photoprint mounting surface area for storing machine readable photoprint parameter information (e.g. bar codes or adjustable indicator elements). This machine readable information is detected by one or more image parameter sensors 30 located in the feed path of platen imaging station 17. The outputs of these sensors are coupled to a micro-controller 38, which controls the operation of the scanner, including the imaging optics to rapidly project and focus the image on the photoprint onto an opto-electronic image sensor (a high resolution CCD image sensor).

The platen feed mechanism includes a set of controllably driven pinch rollers 41 located between magazine 32 and platen imaging station 17, and a set of controllably driven pinch rollers 43 located between platen imaging station 17 and magazine 34. A controllably stepped drive motor 45 is coupled to rollers 41 and 43 by means of a conventional pulley/drive belt arrangement, not shown, and is controllably driven by the system micro-controller to rotate the pinch rollers and thereby sequentially extract a platen from a bottom slot 33 of supply magazine 32, translate an extracted platen to imaging station 17 and then translate the platen from imaging station 17 to a lower entry slot 35 of take up storage magazine 34. A second imaging station illuminator 36 comprised of a rectangular configuration of a set of four fluorescent lamps, similar to that of illuminator 29 for the first imaging station 15, is located directly above platen imaging station 17, so as to provide effectively even illumination of an individual photoprint carried by a platen that has been transported to imaging station 17.

Supported within housing 11 between upper and lower imaging stations 15 and 17 is a multi-directional image projection mechanism 50. Image projection mechanism 50 is operable to selectively project the image of a photoprint at a selected one of imaging stations 15, 17 to an image magnification/focussing unit 52. Image magnification/focussing unit 52 includes an adjustable image magnification unit, such as an adjustable focus, zoom lens 54, which is operative to controllably vary the size and focus of an image of the photoprint that is projected onto an opto-electronic scanning unit 60. In a preferred embodiment of the invention, image magnification/focussing unit 52 is controlled by an adjustable default magnification and focussing mechanism that is particularly useful in connection with the automated mode of operation for scanning platen-mounted photoprints that are sequentially fed to lower, platen imaging station 17.

Such an adjustable default magnification and focussing mechanism for conducting automated imaging of a platen-mounted photoprint is preferably of the type described in co-pending U.S. patent application Ser. No. 760,458, filed Sep. 16, 1991 by K. A Parulski et al, entitled "Print Scanner With Soft Key Variable Magnification," assigned to the assignee of the present application and disclosure of which is herein incorporated. As described in that application, when a platen-mounted photoprint is fed to platen imaging station 17, image parameter information, such as photoprint size (e.g. 3R, 4R, 5R), that is contained in one or more of the machine readable regions on the platen, adjacent to the photoprint mounting surface, is detected by sensors 30 and supplied to the scanner's micro-controller. The micro-controller controls the operation of the image magnification/focussing unit 52, such that the photoprint image is projected and focussed on the image sensor in accordance with the detected parameter data. The machine readable regions on the platen may also contain addition image parameter information such as aspect ratio (e.g. 4:3, 1:1), image orientation (horizontal (H) or vertical (V)), or print type (monochrome or color), which is read by the micro-controller for subsequent storage as part of that photoprint's image file to be recorded on a compact disc, so that the stored image may be properly displayed on a television display.

The photoprint image that is focussed on the image sensor is, in turn, coupled to a 'preview' display, shown diagrammatically at 40 in FIG. 4. By observing the 'preview' display, the operator adjusts as necessary the default settings of the image magnification/focussing unit, until the previewed image is correctly focussed and geometrically positioned on the 'preview' display screen. Any adjustment of these default settings is stored in a look-up table, so that the control parameters for the image magnification/focussing unit are now effectively calibrated to a first of a series of like photoprints of a sequence. Thereafter, for subsequently fed platen-mounted photoprints, the operation of the image magnification/focussing unit projection device is automatically referenced to the newly calibrated parameter settings, thereby facilitating rapid scanning of a series of platen-mounted photoprints.

The image projection mechanism 50 also includes a first, controllably rotatable mirror 53 disposed between top plate 21 and platen imaging station 17, and a second, fixed mirror 56 disposed in a projection path 58 between rotatable mirror 53 and scanning unit 60. Rotatable mirror 53 may be controlled manually, as by way of a linkage with a control knob (shown diagrammatically at 55), or it may be coupled to a motor driven actuator (not shown). Opto-electronic scanning unit 60 preferably comprises a color sequential scanner of the type described in co-pending U.S. patent application Ser. No. 474,772, filed Aug. 31, 1990, entitled "Color Sequential Scanner Incorporating A Synchronized Variable Exposure Shutter" by K. A. Parulski et al, assigned to the assignee of the present application and the disclosure of which is herein incorporated. As described in that application, advantage is taken of the improved color balance properties of fluorescent lamps, by synchronizing the exposure time of an electronic shutter (through which respective red, blue and green color images of a photoprint are sequentially captured by a high resolution opto-electronic image sensor) with the AC power source for the lamps. By using a high resolution image sensor, such as a 1532×1024 pixel CCD image sensor, and effecting a sequential X-Y physical displacement of the image relative to the sensor via angled glass plates incorporated into image magnification/focussing unit 52, as described in the above referenced Parulski et al application entitled "Print Scanner With Soft Key Variable Magnification," makes it possible to realize a 3072×2048 pixel (high resolution) image corresponding to that obtained by the image pixel matrix of a high resolution color film scanner.

For each respective monochromatic image (one of red, green and blue, as determined by a sequentially stepped color filter incorporated into image magnification/focussing unit 52), the sensor output is digitized and stored in an associated image memory or framestore in host computer 14. As described previously with reference to the co-pending Kristy application, the stored digitized image is processed by a host image processor for storage on a digital storage medium, such as a compact disc, which may then be delivered to the customer for playback by a CD player and display on a home television set.

As described above, in order to allow the scanner operator to optimally adjust the projection and focussing parameters of the scanner, such as any required movement of translatable unit 13 and adjustment of zoom lens 54, the output of the high resolution CCD image sensor is coupled separately of the high resolution image processing workstation to an auxiliary, lower resolution, monochromatic 'preview' display unit 70. While it is possible to use the high resolution color display terminal of the photofinishing workstation for this purpose, from a practical operational standpoint, the processing time required to display the full color 2K×3K pixel image is prohibitive. For successful operation of the scanner, particularly for its sequential platen scanning mode, what is necessary is that, prior to image capture, the photoprint be correctly positioned, and its image correctly sized and focussed on the image sensor. To satisfy these requirements during a 'preview' of the image, the scanner operator does not need to view a full color image at its highest resolution; a lower resolution, monochromatic image will do.

In accordance with a preferred embodiment of the invention, in order to rapidly preview what is seen by the CCD image sensor, the output of the image sensor is preferably coupled to an auxiliary preview framestore apparatus of the type described in co-pending U.S. patent application Ser. No. 760,302, filed Sep. 16, 1991, entitled "Megapixel Video Previewer Framestore and Display", by K. A. Parulski et al, assigned to the assignee of the present application, and the disclosure of which is herein incorporated.

As described in that application, the auxiliary preview framestore apparatus includes a pair of 'ping-pong' write/read memories, the pixel and line rate clocks to the address generators of which are multiplexed, so as to not only permit rapid display of the photoprint image, but to display the image in a variety of formats for optimizing the manner in which the photoprint is digitized and stored.

OPERATION

Upper Station Imaging

For scanning a photoprint by use of upper imaging station 15, an individual photoprint or a photo album is placed in a face-down condition on top plate 21 and the translatable unit 13 is positioned as necessary to locate upper imaging station 15, such that the photoprint is transported to an optimum scanning position, as displayed by 'preview' display 40. The operator then controls the image magnification/focussing unit 52 until the displayed image of the photoprint is satisfactory. The image is then scanned by scanning unit 60, and the resulting digitized high resolution color image of the photoprint is stored in host computer 14.

Platen Station Imaging

As pointed out above, platen imaging station 17 is used to automatically digitize a plurality of photoprints that are mounted to respective ones of a stack of platens the are fed in sequence to the platen imaging station 17 from a platen supply magazine 32. As each platen is fed to the platen imaging station, image parameter data, such as photoprint size (e.g. 3R, 4R, 5R), aspect ratio (e.g. 4:3, 1:1), image orientation (horizontal (H) or vertical (V)), or print type (monochrome or color) that is contained in one or more of the machine readable regions on the platen is detected by one or more image parameter sensors 30 and coupled to micro-controller 38.

On the basis of the photoprint size data, micro- controller 38 controls adjustable image magnification unit 54, so as to adjust the size and focus of the image seen by the image sensor. By virtue of the adjustable default magnification and focussing mechanism, the operator is able to adjust the default settings of the image focussed on the image sensor and as he observes the monochromatic image that is coupled to the image 'preview' display. Because adjustments of these default settings are stored in a look-up table, the control parameters for the image magnification/focussing unit will be properly calibrated for each of a series of like photoprints of a sequence, based upon or referenced to a first photoprint of the sequence. Thereafter, for subsequently fed platen-mounted photoprints, the operation of the image magnification/focussing unit projection device is automatically referenced to the adjusted default settings, thereby facilitating rapid scanning of a series of platen-mounted photoprints.

As will be appreciated from the foregoing description, the dual station photoprint scanner in accordance with the present invention provides the photofinisher with the capability of scanning and digitizing an individual photoprint or a plurality of photoprint images, such as 'dated' photographs which the customer may bring to the photofinisher in a loosely arrayed pile or mounted in a photo-album binder, thereby allowing a photofinisher to rapidly process any number of pictures supplied by the customer, irrespective of the form or condition in which the photoprints are supplied.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. A dual imaging station apparatus for electro-optically scanning an image that has been recorded on a sheet of photographic recording material comprising:
    a housing having a face-down imagery station including a top plate upon which a sheet of photographic recording material may be placed in a face-down condition, and a sheet support platen feed mechanism mounted in said housing at a location displaced from said top plate and operative to sequentially translate a plurality of separate sheet support platens from a platen supply magazine, to a platen imaging station to scan separate pieces of photographic recording material which have been previously mounted on said separate sheet support platens;
    a multi-directional image projection mechanism supported within said housing and being operable to selectively project one of an image recorded on a sheet of photographic recording material that has been placed face down on said top plate or an image recorded on a sheet of photographic recording material that has been placed on a sheet support platen, fed by said sheet support platen feed mechanism to said platen imaging station;
    a photo-responsive conversion device supported within said housing at an image projection plane of said multi-directional image projection mechanism; and
    an imagery data storage mechanism, coupled to said photo-responsive conversion device, and being operative to store, on a digital data storage medium, a digital representation of an image that has been projected on said photo-responsive conversion device by said multi- directional image projection mechanism.

2. A dual imaging station apparatus according to claim 1, wherein a sheet support platen includes one or more photoimage characteristic identifying regions, representative of one or more parameters of the image recorded on a sheet of photographic material carried by said platen, and wherein said apparatus further includes an identifying region sensor operative to read the contents of said one or more photographic characteristic identifying regions, and provide an output representative thereof.

3. A dual imaging station apparatus according to claim 2, wherein said multi-directional image projection mechanism is operative to controllably project, onto said photo-responsive conversion device, an image recorded on a sheet of photographic recording material that has been mounted on a sheet support platen and fed to said platen imaging station, in accordance with the contents of said one or more photographic characteristic identifying regions as read by said identifying region sensor.

4. A dual imaging station apparatus according to claim 1, wherein said multi-directional image projection mechanism comprises a first controllably rotatable mirror disposed between said top plate and said platen feed mechanism.

5. A dual imaging station apparatus according to claim 1, wherein said multi-directional image projection mechanism further includes a second mirror disposed in an optical projection path between said first controllably rotatable mirror and said photo conversion device.

6. A dual imaging station apparatus according to claim 1, wherein said housing has a sloped support surface adjacent to said top plate, thereby providing, in cooperation with said top plate, a photo album support for supporting a photo album in an open, face-down condition, so that a page of said photoalbum may be placed face-down on said top plate.

7. A dual imaging station apparatus according to claim 1, wherein a sheet support platen comprises a generally rectangular, flat platen having a pair of side rails adjacent to side edges of the platen, said side rails serving to permit another platen to be placed thereon without touching a sheet of photographic material that has been placed on the platen between the pair of side rails.

8. A dual imaging station apparatus according to claim 7, wherein an end edge of a platen has a sloped surface so as to cause a platen successively fed by said platen feed mechanism to slide beneath a previously fed platens into a stacked configuration.

9. A dual imaging station apparatus according to claim 1, wherein said multi-directional image projection mechanisms comprises an adjustable image magnification device which is operative to controllably vary the size of the image projected onto said photo-responsive conversion device.

10. A dual imaging station apparatus according to claim 9, wherein said adjustable image magnification device comprises an adjustable focus zoom lens.

11. A multiple image station photoprint scanner comprising:
a housing having a face-down imagery station including a first imaging station comprising a transparent plate upon which a photoprint to be scanned is placed in a face-down condition, and a second, platen imaging station arranged adjacent to a platen feed mechanism mounted in said housing at a location displaced from said first imaging station, said platen feed mechanism being operative to translate a plurality of separate sheet support platens from a platen supply magazine, to said platen imaging station, in order to scan separate pieces of photographic recording material which have been previously mounted on said separate sheet support platens;
an image projection mechanism supported within said housing and being operable to selectively project the image of one of a photoprint placed face down on said transparent plate of said first imaging station and a photoprint carried by a photoprint support platen, said platen being fed by said platen feed mechanism to said platen imaging station; and
an image sensor supported within said housing t an image projection plane of said image projection mechanism.

12. A multiple image station photoprint scanner according to claim 11, further comprising an imagery data storage mechanism, coupled to said image sensor, and being operative to store a digital representation of an image that has been projected on said image sensor by said image projection mechanism.

13. A scanner according to claim 11, wherein said image projection mechanism comprises a first controllably rotatable mirror disposed between said transparent plate and said platen feed mechanism.

14. A scanner according to claim 11, wherein said image projection mechanism further includes a second mirror disposed in an optical projection path between said first controllably rotatable mirror and said image sensor.

15. A scanner according to claim 11, wherein said housing has a sloped support surface adjacent to said transparent plate, thereby providing, in cooperation with said transparent plate, a photo album support for supporting a photo album in an open condition, so that a page of said photo album may be placed face-down on said transparent plate.

16. A scanner apparatus according to claim 11, wherein said image projection mechanism comprises an adjustable image magnification device which is operative to controllably vary the size of the image projected onto said image sensor.

17. A scanner according to claim 16, wherein said adjustable image magnification device comprises an adjustable focus, zoom lens.

18. A scanner according to claim 11, wherein a photoprint support platen comprises a generally rectangular, flat platen having a pair of side rails adjacent to a photoprint mounting region of the platen, said side rails serving to permit another platen to be placed thereon without touching a photoprint that has been placed on the platen.

19. A scanner according to claim 18, wherein an end edge of a platen has a sloped surface so as to enable a platen successively fed by said platen feed mechanism to slide beneath a previously fed platens into a stacked configuration.

20. A scanner according to claim 11, wherein a platen includes one or more photo image characteristic identifying regions, representative of one or more parameters of the image recorded on a photoprint carried by said platen, and wherein said scanner further includes an identifying region sensor operative to read the contents of said one or more photographic characteristic identifying regions, and provide an output representative thereof.

21. A scanner according to claim 20, wherein said image projection mechanism is operative to controllably project, onto said image sensor, an image of a photoprint that has been mounted on a platen and fed to said platen imaging station, in accordance with the contents of said one or more photographic characteristic identifying regions as read by said identifying region sensor 22. A scanner according to claim 21, wherein said image projection mechanism includes an adjustable focus zoom lens, operational parameters of which are controlled in accordance with the contents of said one or more photographic characteristic identifying regions as read by said identifying region sensor.

23. A scanner according to claim 22, wherein said image projection mechanism has operational default settings associated with said one or more photographic characteristic identifying regions as read by said identifying region sensor, the contents of said operational default settings being adjustable.

* * * * *